(12) United States Patent
Foody, Sr.

(10) Patent No.: US 8,157,955 B2
(45) Date of Patent: *Apr. 17, 2012

(54) METHOD AND SYSTEM FOR THE LARGE SCALE COLLECTION OF LIGNO-CELLULOSIC BIOMASS

(75) Inventor: Patrick J. Foody, Sr., Hudson (CA)

(73) Assignee: Iogen Energy Corporation, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/020,895

(22) Filed: Feb. 4, 2011

(65) Prior Publication Data

US 2011/0188949 A1 Aug. 4, 2011

Related U.S. Application Data

(63) Continuation-in-part of application No. 11/769,850, filed on Jun. 28, 2007.

(60) Provisional application No. 61/301,928, filed on Feb. 5, 2010, provisional application No. 60/836,737, filed on Aug. 10, 2006.

(51) Int. Cl.
*D21C 5/02* (2006.01)

(52) U.S. Cl. ............. 162/41; 162/42; 162/43; 162/91; 162/92; 162/93; 162/94; 162/95; 162/96; 162/97; 162/98; 162/99; 162/23; 162/24; 162/26; 162/28

(58) Field of Classification Search .............. 162/41–43, 162/91–99, 23, 24, 26, 28
See application file for complete search history.

(56) References Cited

U.S. PATENT DOCUMENTS

| 3,995,328 | A | * | 12/1976 | Carolan et al. | 4/316 |
|---|---|---|---|---|---|
| 4,305,688 | A | | 12/1981 | Savins | 406/197 |
| 4,461,648 | A | | 7/1984 | Foody | 127/37 |
| 4,808,526 | A | | 2/1989 | Lawford | 435/161 |
| 5,755,928 | A | | 5/1998 | Foody et al. | 162/49 |
| 5,916,780 | A | | 6/1999 | Foody et al. | 435/99 |

(Continued)

FOREIGN PATENT DOCUMENTS

| GB | 2 145 732 A | 4/1985 |
|---|---|---|
| JP | 2002-330644 | 11/2002 |
| JP | 2005-118011 | 5/2005 |

OTHER PUBLICATIONS

Amit Kumar et al, "Pipeline transport and simultaneous saccharification of corn stover"; Bioresource Technology 96 (2005) pp. 819-829.

(Continued)

*Primary Examiner* — Jessica L Ward
*Assistant Examiner* — Erin Saad
(74) *Attorney, Agent, or Firm* — Fitzpatrick, Cella, Harper & Scinto (57) ABSTRACT

A system for collecting ligno-cellulosic biomass over a large area to enable the commercial refining of biomass from 2,500 to in excess of 50,000 tons of biomass per day to produce ethanol or other products. The biomass is collected at a series of collection points and then transported through a network of conduit "loops" interconnecting each of the collection points and the central refining plant. The water used to transport the biomass, as a slurry, is recovered and sequentially recycled in the same pipeline system to push the biomass slurry around the system in a "loop." The outgoing and return legs of each loop optionally are located adjacent each other.

2 Claims, 7 Drawing Sheets

U.S. PATENT DOCUMENTS

| | | | |
|---|---|---|---|
| 6,616,375 B1 | 9/2003 | Eriksson | 405/51 |
| 6,838,000 B2 | 1/2005 | Braun | 210/603 |
| 2004/0025715 A1 | 2/2004 | Bonde et al. | 99/485 |
| 2004/0034262 A1 | 2/2004 | Van de Beld et al. | 585/240 |
| 2004/0168960 A1 | 9/2004 | Holtzapple et al. | 210/101 |
| 2004/0171136 A1 | 9/2004 | Holtzapple et al. | 435/283.1 |
| 2006/0048920 A1 | 3/2006 | Helleur | 165/108 |
| 2006/0112638 A1 | 6/2006 | Suyama et al. | 48/197 R |
| 2006/0154352 A1 | 7/2006 | Foody et al. | 435/161 |

OTHER PUBLICATIONS

Amit Kumar et al, "Innovation in biomass transport. Workshop on Biomass Feedstock Integration for Bio-industry in Canada"; Feb. 4, 2005.

Amit Kumar et al, "Pipelines: Moving Biomass and Energy"; Second National Conference of BIOCAP Canada, Oct. 31, 2006.

International Search Report PCT/CA2007/001462, dated Feb. 6, 2008.

\* cited by examiner

TYPICAL LOOP SYSTEM

FEEDSTOCK TRANSPORT SYSTEM

SOLIDS-LIQUID SEPARATION

FIG. 1B

TYPICAL FEEDSTOCK PUMP STATION

METHOD AND SYSTEM FOR THE LARGE SCALE COLLECTION OF LIGNO-CELLULOSIC BIOMASS

This application claims the benefit of U.S. Provisional Application No. 61/301,928, filed Feb. 5, 2010, and is a continuation-in-part of U.S. patent application Ser. No. 11/769,850, filed Jun. 28, 2007, which is a non-provisional of U.S. Provisional Application No. 60/836,737, filed Aug. 10, 2006, all of which are incorporated by reference as if fully set forth herein.

BACKGROUND OF THE INVENTION

1. Field of the Invention

The invention is in the field of biomass collection and preconditioning for subsequent refining into ethanol and other products. Specifically, the invention is directed to the collection of agricultural biomass over a large area so as to take advantage of economies of scale. According to embodiments, the biomass may be preconditioned to a selected pH, either in stockpiles, or at a centrally located plant prior to downstream processing.

2. Description of the Related Art

In the search for alternatives to petroleum as a transportation fuel, ethanol has been seen to be of promise, at least as a supplement to petroleum-derived gasoline. Ethanol is derivable from sugar using relatively simple technology, and it is very well-characterized in its properties and its health and environmental impact, humankind having produced ethanol (beer, wine and distilled spirits) for thousands of years. Further, ethanol has had an established use as a motor vehicle fuel for decades; the Ford Model T, first introduced in 1908, was capable of using either gasoline or ethanol as its fuel (or a mixture, as used by automobiles in the U.S. today).

At the present time, the ethanol used for fuel is largely made from corn, specifically the seed of the plant (kernels), although from a technological standpoint almost any grain or fruit can be used. The corn kernels consist largely of starch, which is readily converted to sugar. Most basically, the sugar derived from corn is fermented, typically using a yeast, which digests the material and produces ethanol as a product of yeast metabolism. Although simple and based on well-established technology, corn-derived ethanol has been criticized for being inefficient and diverting food to fuel use, thus making the price of corn, animal feed and livestock higher.

In contrast to grain ethanol, ethanol from agricultural, forest and similar biomass (also referred to herein as cellulosic ethanol) is seen to have great promise in energy efficiency and green house gas reduction. The particular biomass of interest is the structural portion of the plant, such as grass straw and corn stalks, or the woody portion of trees. This plant matter is made of lignin and cellulose, and is a not source of food for people. In ethanol manufacture, the lignin is separated and used for fuel and the cellulosic material is converted to sugars. The sugars are fermented as with the grain to ethanol.

Manufacturing cellulosic ethanol (i.e., ethanol derived from cellulose) is also advantageous because it is sustainable over the long term. In addition, use of biomass as a feedstock for ethanol manufacture can result in no net green house gas emissions, in fact if carbon dioxide from the fermentation step is collected and sequestered, the net green house gas emissions for the entire fuel cycle (field to wheels) is negative. This is because the agricultural biomass removes more carbon dioxide from the atmosphere while it is growing than is emitted during biomass transportation, biomass processing to produce ethanol (when carbon dioxide from fermentation is sequestered), ethanol transportation and ethanol combustion in the vehicle.

U.S. Pat. No. 4,461,648 to Patrick Foody, herein incorporated by reference in its entirety, discloses technology in which cellulose is made accessible for chemical reaction by a process of steam explosion and chemical disintegration to break down the bonds between the lignin and cellulose in the biomass. During the 1970's, after the first "oil shock" occurred, the inventor was conducting research on making low-grade fiber and wood digestible to ruminant animals. He recognized that accessibility of these materials to ruminant animal microflora and accessibility to enzymes was in fact a very similar problem. Trials were conducted using steam explosion to fractionate the fiber. As it turned out, it was a much more difficult problem than simply "exploding" the fiber to fractionate the internal bonds, and involved a very narrow window across the time/temperature range at which the process could be optimized. Nevertheless, the result of these efforts, disclosed and claimed in U.S. Pat. No. 4,461,648, was a process that made the cellulose completely accessible to enzymes. This was the first breakthrough in the technology and arguably laid the foundation for biomass refining, as the science is currently called.

U.S. Pat. No. 5,916,780, to Brian Foody, et al., herein incorporated by reference in its entirety, discloses technology for pre-treating and transporting biomass, especially as it relates to the production of ethanol.

In order to be viable, cellulosic ethanol must overcome advantages that accrue to its industrial competitors, the grain ethanol and petroleum industries. One of these advantages is that the road, rail, pipeline and river infrastructure for transporting conventional energy products is already in place.

Biomass of the type at issue hereby its nature is at a significant cost and handling disadvantage as compared to these competitors. For example, grain, which is free flowing, weighs 40 lbs to 50 lbs per cubic foot, while biomass weighs 10 lbs per cubic foot in bales, and 5 lbs per cubic foot loose. The largest grain ethanol plants being currently built, without access to water or rail transportation, handle on the order of 2,500 tons per day. At a "test weight" of 5 lbs per cubic foot, the viability of a biomass refining system is largely dictated by access to road systems. The differential in the volume to be moved could challenge the capacity of most road systems.

Because transportation constraints act as a limiting factor on the size of a biomass-processing plant, most biomass projects are built well below optimum size.

In order to take advantage of the cheaper unit cost of agricultural biomass, it is estimated that a system capable of processing significantly in excess of 2,500 tons per day of biomass would be necessary for cellulosic ethanol to compete with easily refined starch based grain ethanol.

The oil industry, the other conventional competitor to biomass refining, has the advantage of "scale" and well established pipeline systems so that it can tolerate significantly higher raw material costs.

It is estimated that a cellulosic ethanol system capable of processing in excess of 10,000 tons per day of biomass would be required to compete with oil.

Further technological and scientific advances in materials handling and physical layouts are necessary to make ethanol from biomass commercially competitive with oil, especially with regard to the economies of scale. Japanese Patent No. JP2002330644 proposes a system for biomass collection. However this patent discloses a pneumatic system and does not adequately address the implementation of a large scale biomass collection and refining system.

Pipeline systems for moving woodchips are not uncommon, but these are normally used on a point-to-point basis. Peter C. Flynn, et al., *Bioresource Technology*, 96 (2005) 819-829 postulates a biomass refining system wherein the water may be pumped back either completely or in part to the beginning of the system. This requires two pipelines, as noted by the author, and is not economically viable.

An important object of this invention is to overcome the difficulties and expenses that arise in connection with handling large amounts of relatively light non-free flowing biomass. The inventor herein has developed a "loop" system for moving a ligno-cellulosic feedstock slurry along the same pipeline as the transportation water, as well as adding new biomass at more than one selected point along the pipeline. According to embodiments of the present invention, conventional delivery systems, except for local pick-ups, can be avoided altogether, in favor of the centralized and integrated network of loops described herein.

SUMMARY OF THE INVENTION

A biomass collection and refining system according to the invention comprises a biomass refining plant and at least one conduit loop having a plurality of collection points serially arranged along the conduit loop, whereby the conduit loop connects the collection points and the refining plant through a continuous circulating arrangement, so that a slurry of water and biomass is transported from the collection points to the refining plant and the transportation water is recovered and reintroduced along with recovered process water to the outgoing conduit. "Conduit," as used herein includes, without limitation, pipes, canals, or like structures. Optionally, the system comprises a plurality of loops connecting the collection points and the refining plant. Also, each loop optionally has its outgoing leg adjacent its return leg, wherein a first in the series of collection points defines the beginning of the return leg and the remaining one or more collection points are located in the return leg.

The method according to the invention involves introducing biomass at a plurality of pick-up points (also referred to herein as "collection points") serially arranged along the conduit loop. The biomass may arrive chopped, or some pH conditioning may be done at the collection points (or elsewhere along the transport path) for introduction into the cooking phase, as desired. The biomass is introduced into the incoming conduit to form a slurry of biomass and liquid (such as, without limitation, a 5 wt % solids mix in water) at one or more of the collection points and is transported through the incoming conduit connecting each of the collection points on a particular "loop" with the central refining plant where the biomass is subjected to cooking. Water is removed from the slurry at the refining plant, using a separating device, cane press, screw press, screens or the like apparatus, and reused for continual transport of biomass through one or more conduit loops.

DETAILED DESCRIPTION OF THE PREFERRED EMBODIMENTS

Biomass is grown crop fiber consisting primarily of cellulose, hemicellulose and lignin, and includes, without limitation, grass, switchgrass, straw, corn stover, cane residuals, general cereal wastes, wood chips and the like, that can be converted to ethanol (or other products) according to the aforesaid U.S. Pat. No. 4,461,648 and U.S. Pat. No. 5,916,780, or other known technology. Thus, as used herein, biomass includes materials that are not free flowing in their native state, such as ligno-cellulosic materials. The invention is intended to be used preferably in connection with the collection and transport of non-free flowing materials (ligno-cellulosic biomass), as these materials are conventionally the most intractable from a materials handling standpoint An acre of arable land may produce as much as 18 tons of biomass per year (sugar cane), and typically 5 tons per acre of corn stover or switch grass in a temperate climate. To ensure an adequate supply, a system according to the invention is typically designed based on 0.67 tons of biomass per acre per year (cereal grain straw) or 1.34 tons of corn stover. This refers to the average amount of biomass obtainable, accounting for domestic disappearance (including the use of biomass for other purposes), alternative crops, and the like, not the maximum amount that the land will produce. Calculations based on genetically modified grass are also included in the Tables below.

As shown in FIG. 2 through FIG. 5, collection points 20 preferably are in the center, or close to the center, of an agricultural area from which biomass will be obtained. These agricultural areas are represented as hexagons in the figures, although that representation is arbitrary, and some variation in the size, shape and topography of the collection areas will be expected. A maximum collection capacity for a facility according to the invention is preferably in a range of up to 50,000 tons per day, which could possibly require a network diameter of about 230 miles, or more. The term "network," depicted for example as network diameter B in FIGS. 2-5, refers to the diameter of the region bounded by the outermost conduits, for example. The number of collection points is not critical, and varies depending on the size of the network, and may range (for example only) between 7 and 100 collection points. Outline 22 is the extent of the agricultural areas serviced by all of the collection points 20.

Figure 2:
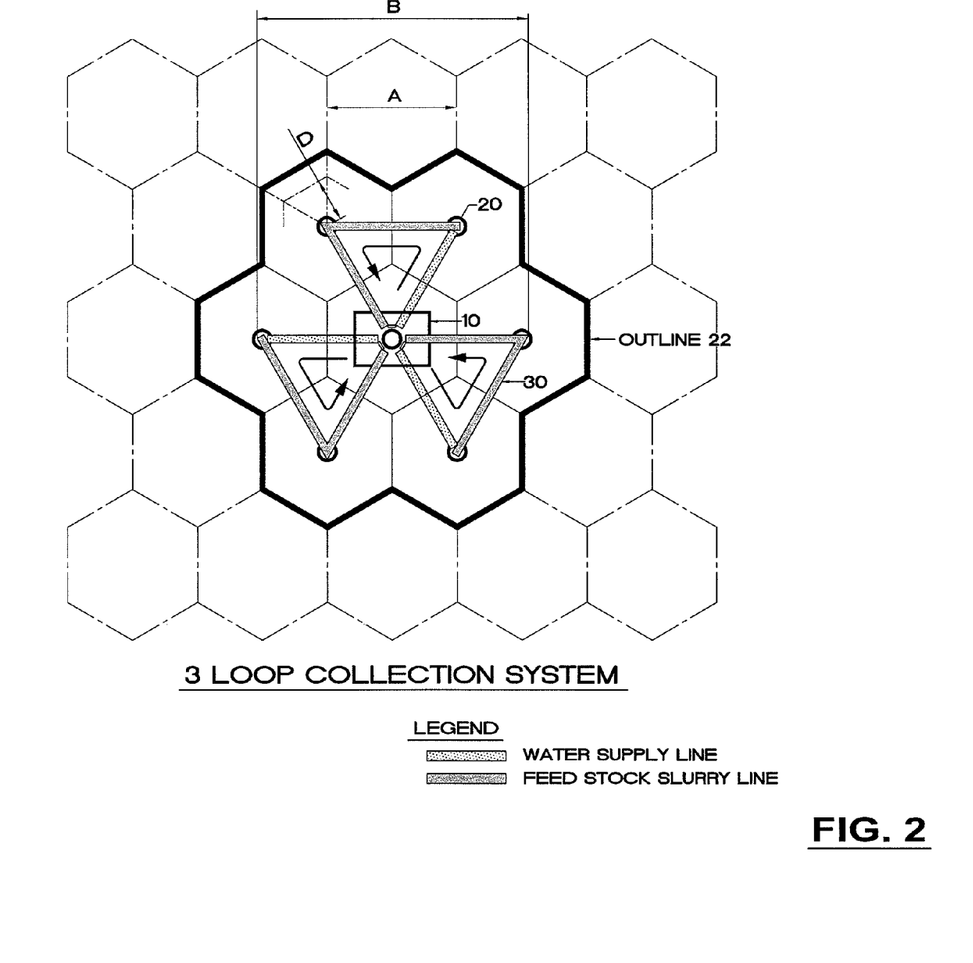
FIG. 2 depicts a typical network configuration comprising three loops entering the refining plant.

As shown in FIG. 2, the size of the total collection area is based on plant processing capability. The following projections have been made based on a plant capacity of about 5,000 tons/day, 12,500 tons/day, 25,000 tons/day, and 40,000 tons/day, resulting in a distance across the entire collection area in a range of about 50 miles to about 200 miles.

from the different collection points according to this invention to ease the task of refining.

A key advantage of the present invention is that the biomass is delivered to collection points by truck or farm wagons

TABLE 1

(FIG. 2)

| PLANT SIZE | TONS PER DAY | 4,590 TPD | | |
|---|---|---|---|---|
| BIOMASS DENSITY TONS/YEAR/ACRE | | STRAW RESIDUAL | SWITCH GRASS/ CORN STOVER | GENETICALLY MODIFIED GRASS |
| | | 0.667 | 1.333 | 2.667 |
| DISTANCE ACROSS FLATS MILES | A | 25.4 | 18.0 | 12.77 |
| AVERAGE LOCAL HAUL MILES | D | 8.47 | 6.0 | 4.25 |
| MAX PERIMETER DISTANCE MILES | B | 50.8 | 36.0 | 25.5 |

TABLE 2

Figure 3:
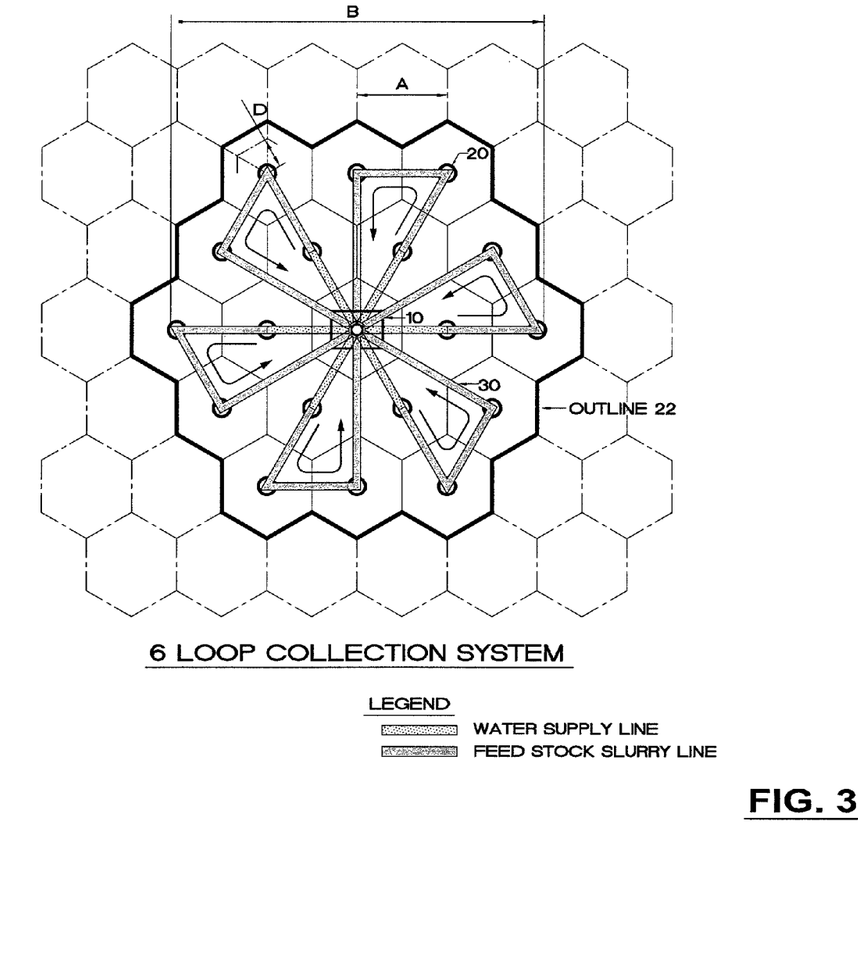
FIG. 3 depicts another configuration in which six separate loops carry material into the refining plant

(FIG. 3)

| PLANT SIZE | TONS PER DAY | 12,456 TPD | | |
|---|---|---|---|---|
| BIOMASS DENSITY TONS/YEAR/ACRE | | STRAW RESIDUAL | SWITCH GRASS/ CORN STOVER | GENETICALLY MODIFIED GRASS |
| | | 0.667 | 1.333 | 2.667 |
| DISTANCE ACROSS FLATS MILES | A | 25.4 | 18.0 | 12.77 |
| AVERAGE LOCAL HAUL MILES | D | 8.47 | 6.0 | 4.25 |
| MAX PERIMETER DISTANCE MILES | B | 101.6 | 72.0 | 51.1 |

TABLE 3

Figure 4:
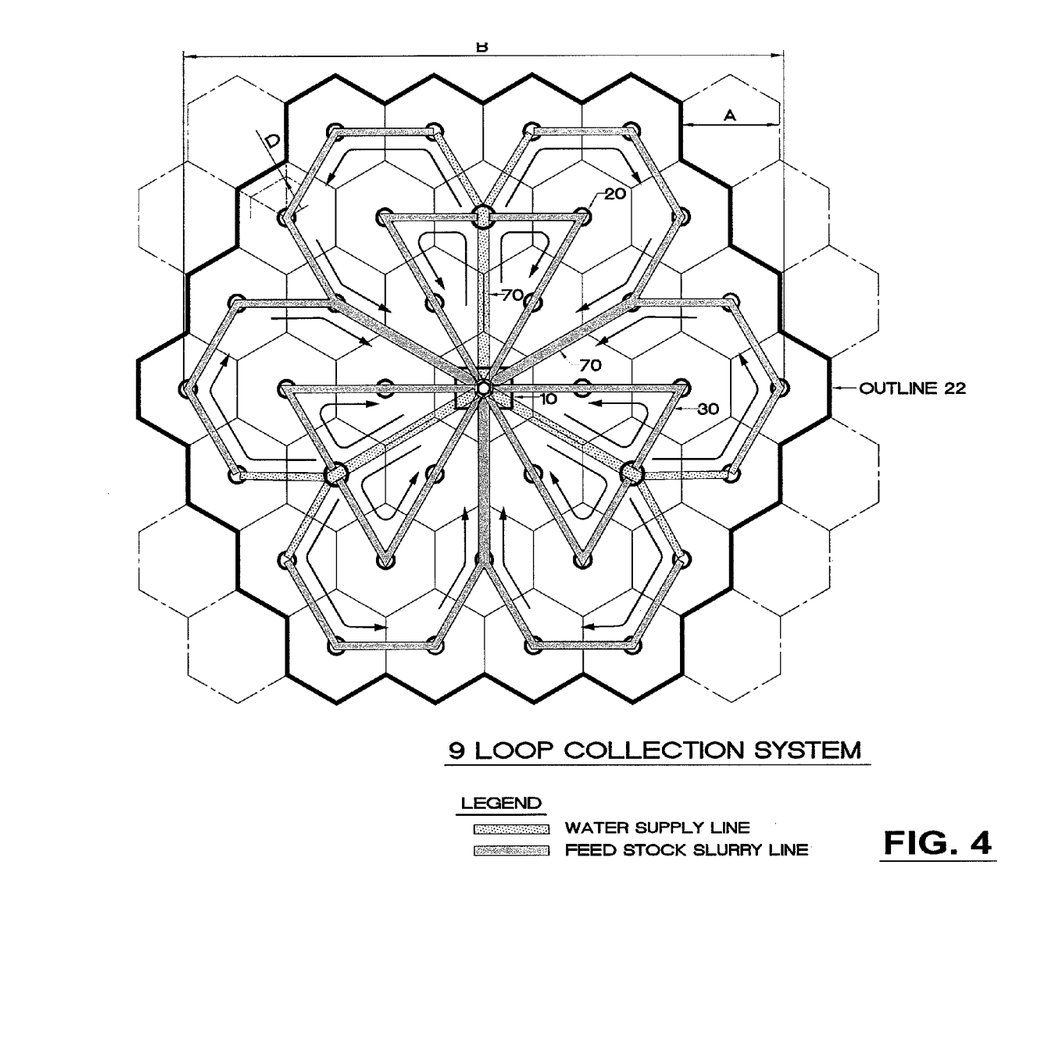
FIG. 4 shows the expansion of the system to twelve separate loops.

(FIG. 4)

| PLANT SIZE | TONS PER DAY | 24,262 TPD | | |
|---|---|---|---|---|
| BIOMASS DENSITY TONS/YEAR/ACRE | | STRAW RESIDUAL | SWITCH GRASS/ CORN STOVER | GENETICALLY MODIFIED GRASS |
| | | 0.667 | 1.333 | 2.667 |
| DISTANCE ACROSS FLATS MILES | A | 25.4 | 18.0 | 12.77 |
| AVERAGE LOCAL HAUL MILES | D | 8.47 | 6.0 | 4.25 |
| MAX PERIMETER DISTANCE MILES | B | 152.4 | 108.0 | 76.6 |

TABLE 4

Figure 5:
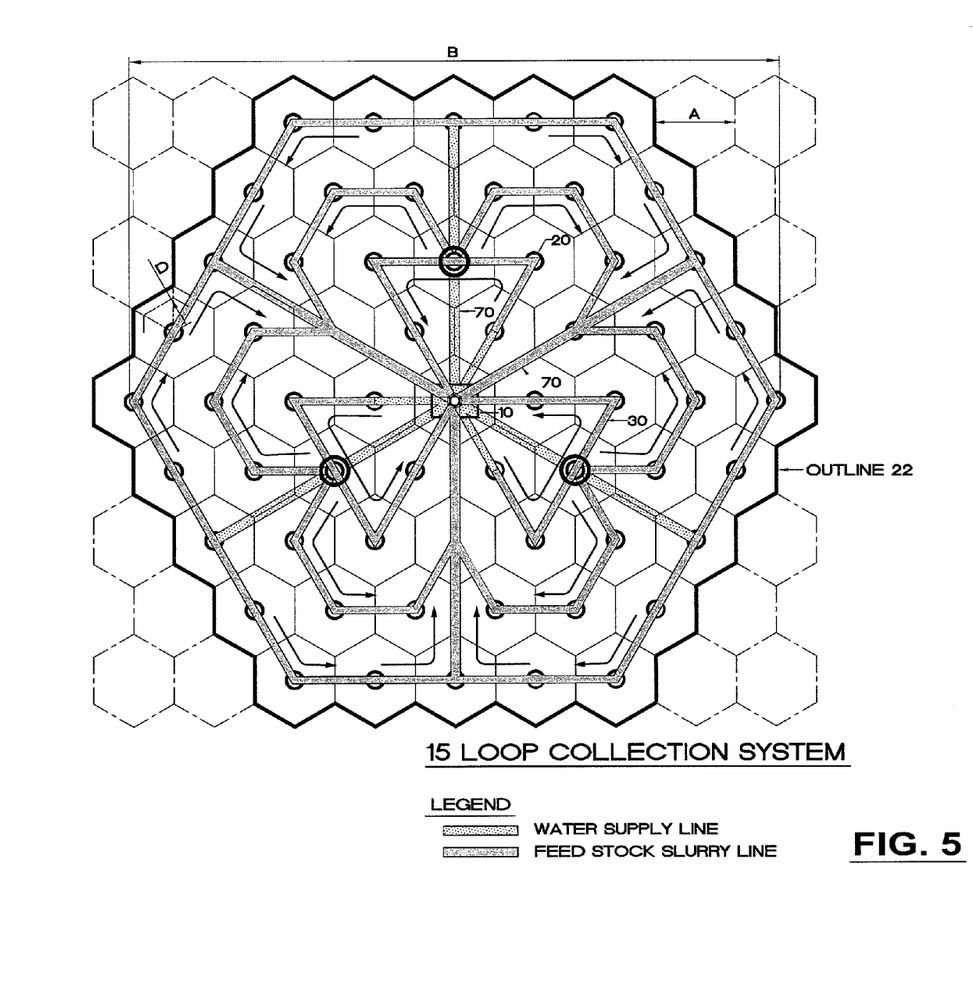
FIG. 5 shows the further expansion of the twelve-loop system to collect biomass from a larger region.

(FIG. 5)

| PLANT SIZE | TONS PER DAY | 40,000 TPD | | |
|---|---|---|---|---|
| BIOMASS DENSITY TONS/YEAR/ACRE | | STRAW RESIDUAL | SWITCH GRASS/ CORN STOVER | GENETICALLY MODIFIED GRASS |
| | | 0.667 | 1.333 | 2.667 |
| DISTANCE ACROSS FLATS MILES | A | 25.4 | 18.0 | 12.77 |
| AVERAGE LOCAL HAUL MILES | D | 8.47 | 6.0 | 4.25 |
| MAX PERIMETER DISTANCE MILES | B | 203.2 | 144.0 | 102.2 |

Biomass feedstocks differ in terms of how much fuel may be produced from a ton of the feedstock, and in terms of which enzymes and other techniques are used for refining the feedstock. Typically 40 to 100 gallons of fuel can be produced from a ton of ligno-cellulosic biomass. It is preferable to have the biomass that is approximately uniform in size collected traveling a relatively short distance D to the collection points 20. For example, in a system calculated to accumulate about 12,500 tons of biomass, comprising 19 collection points, with a little over 25 miles separating the adjacent collection points (distance A), as shown in FIG. 3, and based on a collection of 0.67 tons of biomass per acre per year, the average distance D that would be traveled to a collection site would be on the order of 8.5 miles. This distance from pick-up points is suitable for local hauling, which can be done in a variety of ways by farmers. These numbers are for illustration only and are not to be considered limiting to the invention.

Figure 1:
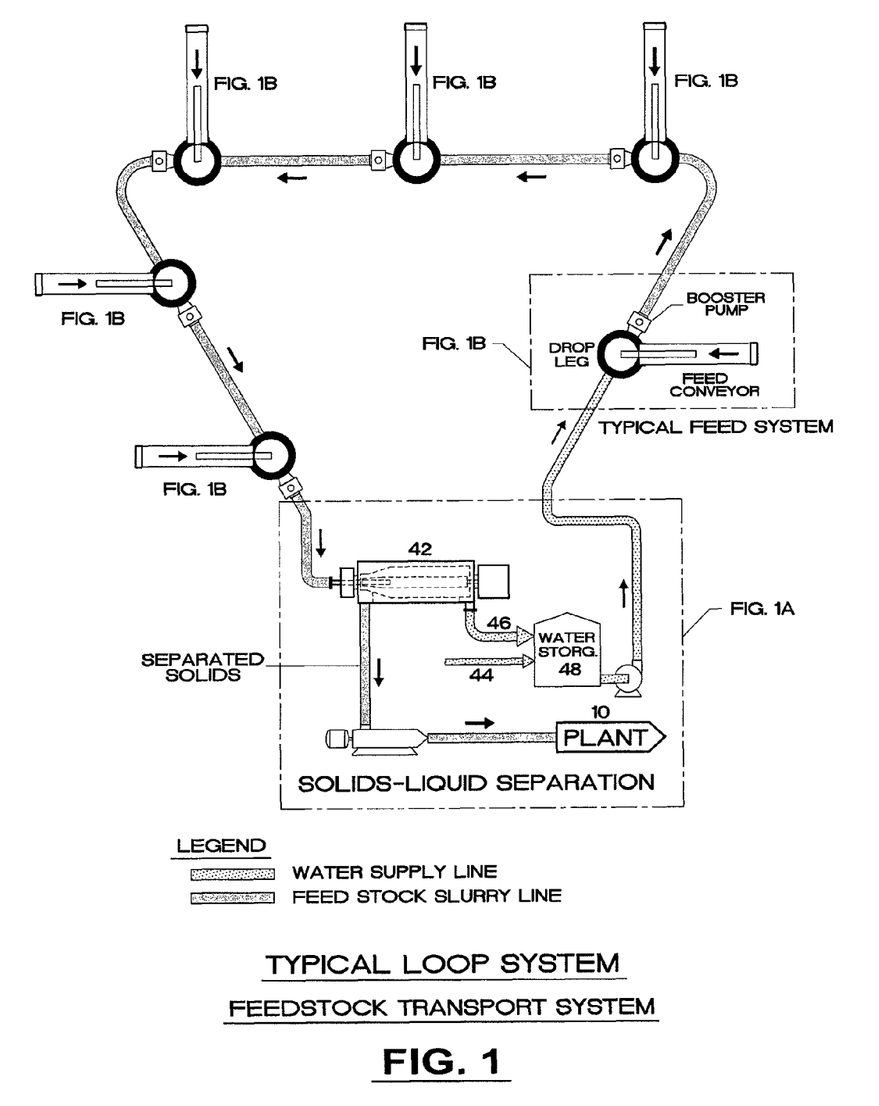
FIG. 1 depicts a single loop configuration showing the general relationship of a centrally located refining plant, an outgoing pipeline system leaving the plant, water being charged into the pipeline system, introduction of biomass at one or several points along the parallel incoming line, as well as the removal of the water for reuse. The biomass then goes into the refining plant.
Figure 1A:
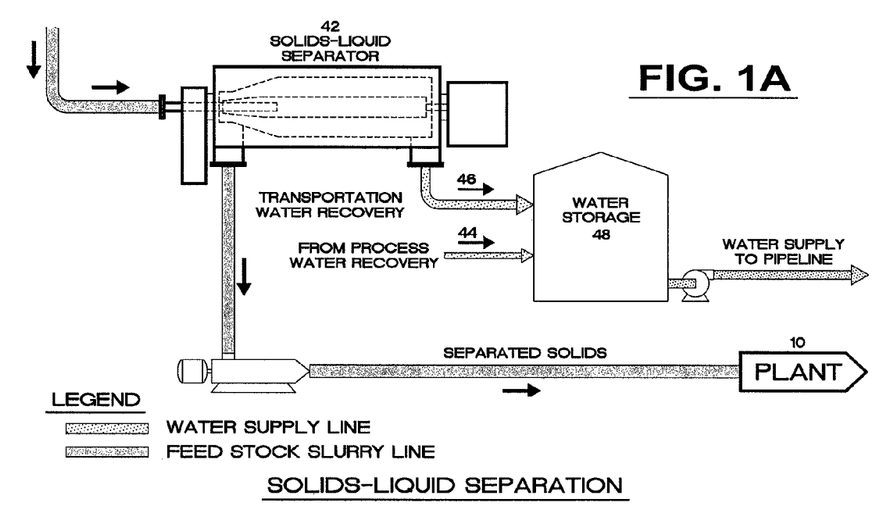
FIG. 1A is a detail of FIG. 1, depicting a typical water removal system using a centrifuge. Alternatively, a cane press, screw presses or the like water removal apparatus may be used.
Figure 1B:
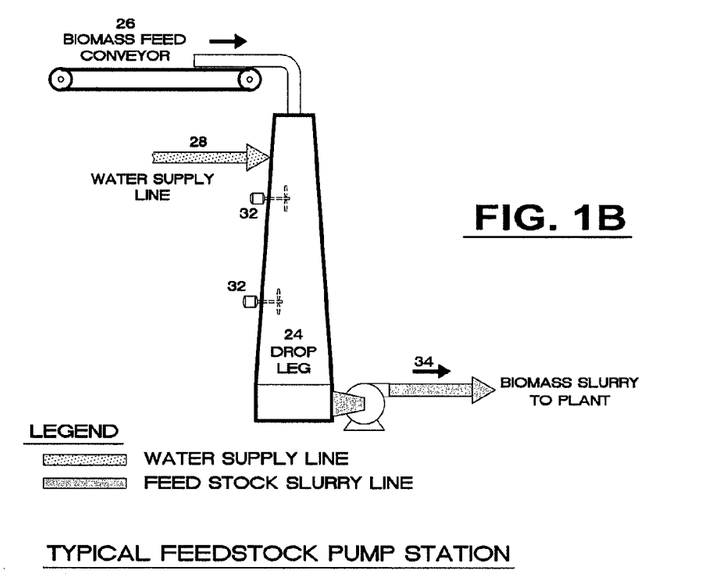
FIG. 1B is a detail of FIG. 1, depicting the details of a dropleg system to introduce solids into the pipeline to form a slurry. Alternative solids introduction apparatus may also be used.

After delivery, the biomass is introduced into the slurry at the collection points 20, for example using a dropleg 24, so that a slurry is formed with the circulating water, as shown in FIG. 1B. The collection points themselves in one embodiment are located in collection areas on the order of one acre in area. The biomass is transported to these collection areas by truck and dumped onto the land for temporary storage; a front loader for example can then be used to move the feedstock such means as are provided to introduce the biomass into dropleg 24.

In particular, in FIG. 1B biomass is introduced to dropleg 24 by conveyor 26, water is supplied through supply line 28 and the water-biomass mixture is agitated by stirrers 32 to form a slurry. The slurry is pumped with a booster pump at 34 into the conduit network. The embodiment described is for illustration only. It is not necessary to use a dropleg. Alternative means, such as a star valve, extrusion screw feeder or the like conventional solids handling means may also be used.

The biomass is chopped beforehand, or at the collection point, preferably to a range of ½ inch to 1½ inch. A cane press or disk refiner may be used to fractionate the biomass so that it can be more easily contacted with the acid or alkali for pH adjustment. A cane press is probably more suited for grasses or straws while the disk refiner might be more applicable for wood chips.

The slurry is then transported to the next collection point by pumps provided at each collection point or at lift stations as required. The amount of water in the slurry may be determined by one of ordinary skill in the art, depending on the pump capacity, pipe size, etc. In the case of a conduit consisting of piping, it is contemplated that a slurry having a solids content of about 5 wt % is sufficiently transportable through the pipes. A standpipe, with a large diameter relative to the pipes in the network of pipes, may be used to accommodate pressure variations in the network, or the standpipe may be used in conjunction with a dropleg, star valve or extrusion screw feeder to input solids into the piping.

Another important aspect of the system is that water, once charged into the network, including excess recovered process water, is reused for transport and the amount of water in the system remains relatively constant, generally without requiring make-up water. Because the agricultural biomass contemplated for use in the present invention contains in a range of about 12 percent to about 50 percent moisture, the addition of biomass to the system results in an increase in the amount of circulating water in the system. A part of this water may be used up in the refining process, for example as steam, or water may be treated and discharged, as necessary, to maintain a constant amount of water in the network. In this context, a relatively constant amount of water will have the meaning ascribed to that term by one of ordinary skill in the art. Preferably, a relatively constant amount of water is an amount required to maintain a solids/liquids ratio of less than 15%. Typically, the amount of water in the system will not vary over the course of operation more than plus or minus 5%.

The network of conduits is arranged so that the refining plant is accessible from all of the collection points along an incoming conduit via a continuous path which carries the slurry of biomass and water to the centrally located refining plant. In FIG. 1, the generalized loop diagram illustrates the conduits coming into the plant with feedstock, the water being recovered and fed back into the pipeline for transporting additional feedstock. In embodiments, the system is designed so that loops can be added to an existing network of conduits, as additional refining capacity is added, to bring the total production to the scale of a small oil refinery processing 90,000 to 100,000 barrels. These numbers are for illustration purposes only and are not to be considered limiting to the invention.

It is preferred that the conduit loops are sized so that 1000 tons/day or more can be collected from collection points in a single loop. A system may be provided with a plurality of conduit loops which can be operated independently, so that one or more loops can be removed from the system, from time to time. In the same manner additional loops can be added in the event more plant capacity and/or agricultural area is added.

The size of the pipes may be determined by one of ordinary skill in the art. For example, in the system shown in FIG. 3, based on a system adapted to accumulate approximately 12,500 tons per day, incoming pipes having a diameter of approximately 24 inches could be effectively used, transporting slurry at approximately 5 ft/sec.

FIG. 2 depicts a loop system of three loops, a loop being defined as a continuous conduit system with each loop passing through the refiner and at least two collection points. A system of loops is a plurality of such loops.

Water is removed from the slurry at the refining plant using a cane press or other slurry water removal means known in the art, including without limitation, centrifugal apparatus, extruders, screens or filters. The water is thereafter recirculated in the network. In an embodiment depicted in FIG. 1A, solids-liquid separation is conducted in a solids-liquid separator such as centrifuge 42. Separated solids are directed to refining plant 10. Water recovered from the refining process 44 and water removed from the slurry 46 may be stored in water storage 48 which may then be used to supply water to the conduit network.

The use of this invention can be conducted in various ways. For example, it is possible to introduce biomass into the conduit loop at only one collection point at a time (serial utilization). This allows the user to employ only one loading crew, which travels from collection point to collection point to introduce into the conduit loop biomass previously delivered by truck to the collection point. Alternatively, biomass can be introduced into the conduit loop at a number of collection points at the same time (simultaneous utilization). Operation in such a manner would necessarily require multiple loading crews.

Where closed piping is employed for the conduit loop, the diameter of the piping in the outgoing leg prior to introduction of biomass at the first collection point need be of sufficient diameter only to carry the design circulating water flow. Past the first collection point, the piping needs to have a diameter sufficient to carry both the water and the introduced biomass. In the case where biomass is to be introduced into the conduit loop at only one collection point at a time, the diameter of the piping downstream of that collection point can be sized to have a diameter sufficient to carry both the water and the biomass introduced at a single collection point. In the case where biomass is to be introduced into the conduit loop at a number of collection points at the same time, the diameter of the piping downstream of each such collection point needs to have a diameter sufficient to carry both the water and the biomass introduced at all upstream collection points used simultaneously for biomass collection.

Accordingly, this invention can utilize a number of piping options. For example, the entire conduit loop can use piping of a single diameter, with that diameter sized to carry both the water and the biomass to be introduced simultaneously at all collection points. If only one collection point is to be utilized at a time, then the piping diameter in such a case need only be the diameter necessary to carry both the water and the biomass to be introduced from one collection point. Alternatively, the conduit loop can be made from piping sections of different diameter, where the diameter at any given section need only be sufficient to carry the water and the biomass to be introduced simultaneously at upstream collection points.

As depicted in the exemplary conduit arrangements of FIGS. 2 through 5, the outgoing and return portions of the conduit loop are distal from each other (except adjacent the solids-liquid separation facility) and pass through separate agricultural areas. However, there are circumstances where it is advantageous to place the outgoing and return portions of the conduit loop adjacent one another. In situations where the conduit loop is to be below ground level, this allows the outgoing and return portions to be placed in the same trench, thereby simplifying obtaining the requisite rights of way. Although there is no particular distance between outgoing and return portions mandated by the present invention, a distance of anywhere from touching to 10 meters would be preferred.

Figure 6:
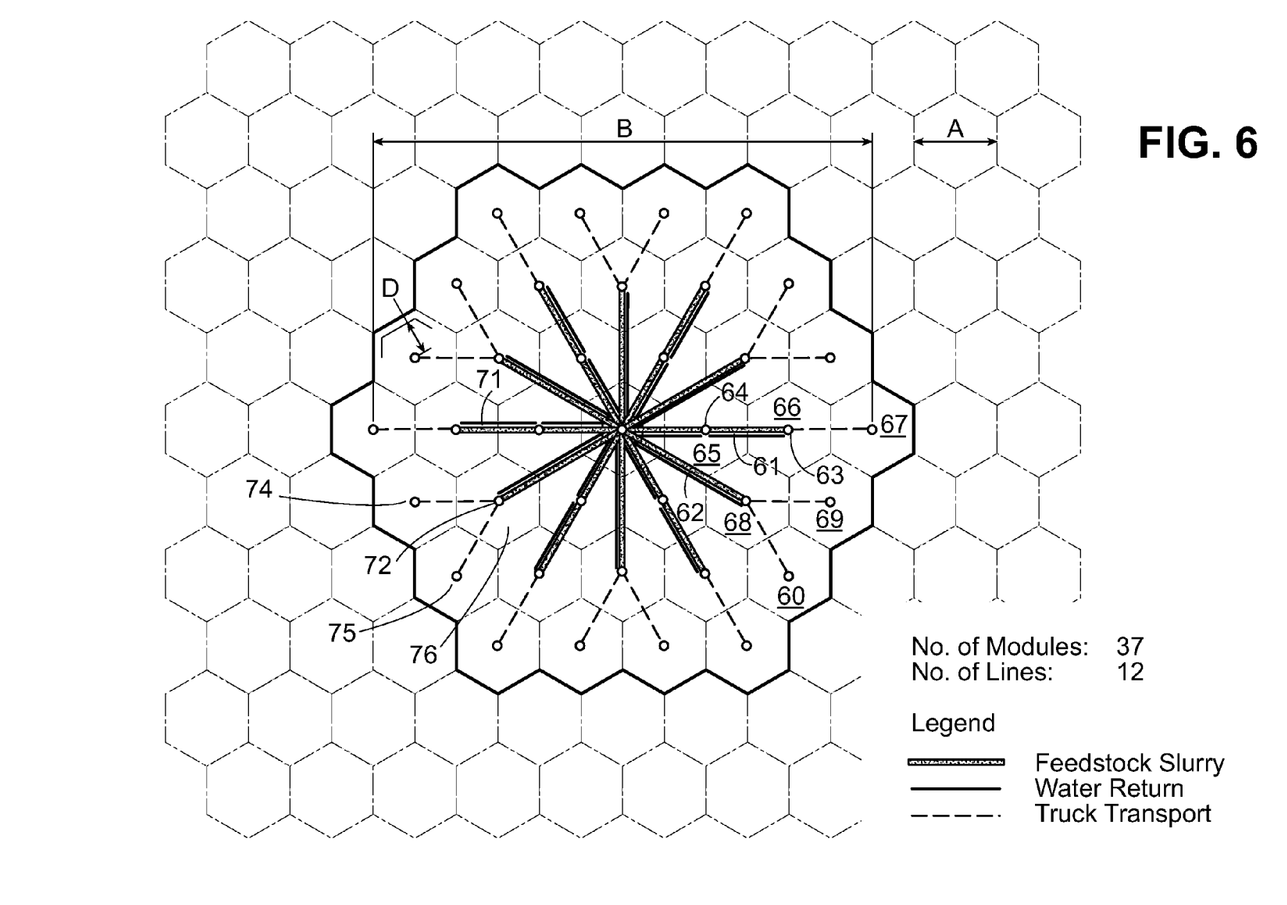
FIG. 6 shows an alternative embodiment of a twelve-loop system, in which the outgoing leg of each loop is located adjacent the return leg.

FIG. 6 depicts one embodiment in which outgoing and return portions of each conduit loop are adjacent each other. In particular, twelve conduit loops are utilized to collect ligno-cellulosic biomass feedstock from thirty-seven agricultural areas, and the outgoing and return portions of each loop are adjacent each other. In this disclosure, the "outgoing portion" (or leg) of a conduit loop is the portion of the conduit between the recirculating water discharge at the refinery and the first collection point, and the "return portion" (or leg) of a conduit loop is the portion of the conduit between the first collection point and the slurry intake of the refinery.

In the embodiment of FIG. 6, six of the conduit loops, exemplified by loop 61, have two collection points 63 and 64. Collection point 63 is located geographically farthest from the biomass refinery at which all loops originate and return, whereas collection point 64 is placed intermediate between collection point 63 and the biomass refinery. It is preferred for collection point 64 to be located in the return portion of conduit loop 61. Collection point 63 receives ligno-cellulosic biomass from agricultural regions 66 and 67, which biomass is harvested and transported preferably by truck proximate to point 63. Collection point 64 receives ligno-cellulosic biomass from agricultural region 65. Thus, the outgoing portion of conduit loop 61, if made of piping, can be sized to have a diameter sufficient to accommodate the design circulating water flow. The return portion of conduit loop 61 between collection points 63 and 64, if made of piping, should be sized to have a diameter sufficient to accommodate the design circulating, water flow, plus the biomass introduced from agricultural regions 66 and 67.

Correspondingly, the return portion of conduit loop 61 between collection point 64 and the biomass refinery should be sized to have a diameter sufficient to accommodate the design circulating water flow plus the biomass introduced from regions 65, 66 and 67, should collection points 63 and 64 be simultaneously utilized. Thus, in such a case, relative to the diameter of the outgoing portion of conduit loop 61 (where piping is employed), the diameter of the return portion of conduit loop 61 between points 63 and 64 optionally is greater to accommodate the larger volume flow (assuming the return slurry velocity approximates the outgoing recirculating water velocity), and the diameter of the return portion of conduit loop 64 and the biomass refinery is greater still.

In the case where collection points 63 and 64 are serially utilized, the diameter of the return portion of conduit loop 61 between points 63 and 64 can be the same as the return portion of conduit loop 61 between point 64 and the biomass refinery.

The sizing of the piping to accommodate the specific volume flow rate as described above allows for savings in piping costs.

In the embodiment of FIG. 6, six of the conduit loops, exemplified by loop 71, have only one collection point 72. This collection point receives ligno-cellulosic biomass feedstock from three agricultural regions, depicted as regions 73, 74 and 75 in FIG. 6. In general, the number of loops per refinery, and the number of collection points per loop, can be varied to match the agricultural region and to optimize the costs.

Referring back to FIG. 4 and FIG. 5, it can be desirable to combine the streams entering and leaving the refinery into larger diameter pipes 70 to reduce the overall length of pipe. In that context, it may be necessary to split the water stream coming from the refining plant or at later collection points to maintain the water balance. In this context, "splitting" means dividing a single larger stream into a plurality of smaller streams. The figures depict joining streams of slurry transported from two or more of the plurality of collection points into a single slurry stream directed to the refining plant and splitting the water removed from the slurry coming from the refining plant for recirculation.

As noted above, the particular biomass refining technology used is not critical to the operation of the collection system. A plant as described in the aforesaid U.S. Pat. Nos. 4,461,648 and 5,916,780 may be used. As noted therein, preconditioning followed by pretreatment is typically required to initially break the bonds between the lignin and cellulose. Thus, in the practice of this invention, acidic or basic circulating water can optionally be used so that preconditioning is effected in the circulating system. For an acid solution, a 2% sulfuric acid solution may be suitable for this purpose, with the exact requirements being determined based on the skill of one of ordinary skill in the art based on the feedstock and refining process being used.

The foregoing description of the preferred embodiments is for illustration only and is not to be deemed limiting of the invention, which is defined in the appended claims.

What is claimed is:

1. A biomass collection and refining system for delivering ligno-cellulosic feedstock to a biomass refining plant for conversion into a fuel comprising:
   a) a plurality of collection points, each including a system for introducing chopped ligno-cellulosic feedstock into a circulating water stream to form a water-ligno-cellulosic feedstock slurry;
   b) a conduit loop, connected to the plurality of collection points, for carrying the circulating water stream, wherein the plurality of collection points are arranged in series along the conduit loop;
   c) a water removal system connected to the conduit loop for:
      i. receiving from the conduit loop the water-ligno-cellulosic feedstock slurry;
      ii. separating the ligno-cellulosic feedstock in the water-ligno-cellulosic feedstock slurry from the water;
      iii. delivering the ligno-cellulosic feedstock to a biomass refining plant; and
      iv. reintroducing separated water into the conduit loop; and
   d) the conduit loop comprising an outgoing leg located adjacent to a return leg, wherein a first in the series of collection points defines the beginning of the return leg and the one or more remaining collection points of the series of collection points are located in the return leg; and e) a biomass refining plant for receiving the ligno-cellulosic feedstock from the water removal system and converting the ligno-cellulosic feedstock into a fuel.

2. The biomass collection and refining system of claim 1, wherein the conduit loop is constructed of piping and the diameter of the outgoing leg is less than the diameter of the return leg.

* * * * *